United States Patent [19]
Holsinger et al.

[11] Patent Number: 5,524,015
[45] Date of Patent: Jun. 4, 1996

[54] OPTICAL NOISE REDUCTION CIRCUITRY FOR LASER SYSTEMS

[75] Inventors: Kevin K. Holsinger, Menlo Park; Harold D. DuBose, Mountain View; Michael McNeal, Hayward, all of Calif.

[73] Assignee: Spectra-Physics Lasers, Inc., Mountain View, Calif.

[21] Appl. No.: 397,391

[22] Filed: Mar. 2, 1995

Related U.S. Application Data

[63] Continuation-in-part of Ser. No. 277,343, Jul. 19, 1994, Pat. No. 5,442,648.

[51] Int. Cl.$^6$ .................................................. H01S 3/00
[52] U.S. Cl. ........................... 372/38; 372/33; 372/29
[58] Field of Search ............................... 378/38, 33, 92, 378/29

[56] References Cited

U.S. PATENT DOCUMENTS

| | | |
|---|---|---|
| 4,314,211 | 2/1982 | Mollenaur . |
| 4,344,173 | 8/1982 | Straus . |
| 4,674,093 | 6/1987 | Angerstein et al. . |
| 4,779,279 | 10/1988 | Brown . |
| 4,792,956 | 12/1988 | Kamin ........................................ 372/38 |
| 5,123,024 | 6/1992 | Dowd et al. . |
| 5,442,648 | 8/1995 | DuBose et al. ........................... 372/38 |

OTHER PUBLICATIONS

Widrow, et al., "Adaptive Signal Processing", published 1985 Chapter 6, pp. 99–101, Chapter 12, 302–306, and 329–331. (No month).

*Primary Examiner*—Leon Scott, Jr.
*Attorney, Agent, or Firm*—Haynes & Davis

[57] ABSTRACT

A servo controlled laser system is provided which provides a laser output beam having reduced optical noise. The laser system may be any type of laser system and preferably is an ion laser system. The servo controlled laser system includes a laser head providing a laser output beam and a power driver coupled to the laser head which supplies input power to the laser head. The laser system also includes a light detector in the path of the output beam which generates an alternating current signal in response to the amount of optical noise detected in the laser output beam. A signal amplifier is coupled to the light detector for receiving and amplifying the alternating current signal. A wire couples the signal amplifier to power driver compensator circuitry which receives the amplified alternating current signal from the wire and, in response, adjusts the input power to reduce optical noise. In instances where a length of the wire is positioned sufficiently near an electrically noisy environment such that the electrically noisy environment modifies the amplified alternating current signal, the significance of the modification to the amplified alternating current signal is reduced by amplifying the alternating current signal prior to exposing the alternating current signal to the electrically noisy environment, thereby enabling a significant reduction in the optical noise present in the laser output beam.

A method for producing a laser output beam having reduced optical noise is also provided using the servo controlled laser system.

17 Claims, 3 Drawing Sheets x=Factor by which signal is amplified x=Factor by which signal is attenuated

OPTICAL NOISE REDUCTION CIRCUITRY FOR LASER SYSTEMS

RELATIONSHIP TO COPENDING APPLICATIONS

This application is a continuation-in-part of U.S. patent application Ser. No. 08/277,343, entitled NOISE REJECTION CIRCUITRY AND LASER SYSTEM USING THE SAME, filed Jul. 19, 1994, now U.S. Pat. No. 5,442,648 which is incorporated herein by reference.

BACKGROUND OF THE INVENTION

1. Field of the Invention

The present invention relates to an improved closed loop servo system for minimizing optical noise present in the output beam of a laser system.

2. Description of Related Art

The power output of a laser can be characterized by the average power output of the laser and the optical noise of the laser output. Optical noise refers to fluctuations in the power output of the laser about the laser's average power output. Some forms of optical noise are periodic and substantially repeatable. For example, many lasers employ a cathode that is heated using alternating electrical power. The electrical fields created by the alternating current used to heat the cathode induce optical noise on the output beam that is periodic and substantially repeatable and therefore predictable. A further example of a periodic and substantially repeatable noise is ripple on the power supply voltage.

Optical noise may also be random and unpredictable in nature. Sources of random optical noise include, for example, vibrations, transverse mode beats and the motion of the arc discharge on the anode and/or cathode of the tube. It is generally desirable to minimize both types of optical noise since both types of noise can interfere with the laser's intended use.

U.S. patent application Ser. No. 08/277,343, entitled NOISE REJECTION CIRCUITRY AND LASER SYSTEM USING THE SAME, filed Jul. 19, 1994, is directed to a closed loop servo system for reducing the periodic and substantially repeatable optical noise found in a laser.

Throughout the laser industry, optical noise has been reduced to levels ranging from about 0.1% peak to peak, to about 1% peak to peak. However, many applications require a greater reduction in the optical noise on the output beam. Accordingly, a laser system which produces an output beam having optical noise below current levels is needed.

Historically, closed loop servos have been utilized to reduce both kinds of optical noise. A closed loop servo typically includes a light detector which detects the average power output of the laser as a direct current signal (DC signal) and the optical noise output of the laser as an alternating current signal (AC signal). The direct current signal is generally on the order of 1–10 volts. The alternating current signal for the optical noise is generally on the order of 1–50 millivolts. The DC and AC current signals from the light detector are frequently carried by one or more wires within an umbilical cable to a summing junction. At the summing junction, the signals are compared to a control signal. The output from the summing junction is then conveyed to a compensator which modulates the power being supplied by the power driver to the laser head in order to maintain a desired average power output and to minimize the amount of optical noise present in the output beam.

High-current wires carrying power from the power supply to the laser head frequently also are contained within the umbilical cable and run parallel to the wire or wires carrying the optical noise signal. The high-current wires typically carry a high level of power, thereby creating an electrically noisy environment near these wires. For example, the high-current wires in a typical ion laser generally carry about 60 amps and 500 volts of power. The electrically noisy environment created by these wires introduces electrical noise into the optical noise signal, frequently in the range of about 1–10 millivolts. Based on standard laser system designs, it generally is not practical to separate the wire or wires carrying the optical noise signal from the high-current wires carrying power from the power supply to the laser head. In addition to the high-current wires, there are variety of other elements that may be present in a laser system which can create an electrically noisy environment near the wire or wires carrying the optical noise signal. These other electrical noise sources can also introduce a significant amount of electrical noise into the optical noise signal.

The compensator is not able to distinguish between the optical noise component of the signal produced by the light detector from the electrical noise introduced into the optical noise signal by the electrically noisy environment. Rather, the compensator only receives an error signal from the summing junction which corresponds to the sum of the optical noise signal and electrical noise.

For example, assume that the optical noise signal from the light detector is 20 millivolts. Also assume that an electrically noisy environment, for example, generated by neighboring high-current wires, alters the optical noise signal by introducing electrical noise. Assuming that 5 millivolts of electrical noise is added to the optical noise signal, the 20 millivolt optical noise signal from the light detector is transformed into a 25 millivolt signal. According to this example, the electrical noise corresponds to 25% of the optical noise signal.

As illustrated by the above example, the optical noise signal in a typical prior art servo control system is generally less than an order of magnitude larger than the electrical noise that can be introduced by an electrically noisy environment present in a laser system. As a result, the signal-to-noise ratio (optical noise:electrical noise) of the error signal fed to the compensator from the summing junction can be low, thereby preventing the accurate measurement and reduction of the optical noise component of the laser output based on the error signal generated at the summing junction. An improved closed loop servo system for reducing optical noise in a laser output is therefore needed.

SUMMARY OF THE INVENTION

The present invention relates to a servo controlled laser system which provides a laser output beam having reduced optical noise. The laser system may be any type of laser system and preferably is an ion laser system. The servo controlled laser system includes a laser head providing a laser output beam and a power driver coupled to the laser head which supplies input power to the laser head. The laser system also includes a light detector in the path of the output beam which generates an alternating current signal in response to the amount of optical noise detected in the laser output beam. A signal amplifier is coupled to the light detector for receiving and amplifying the alternating current signal. A wire couples the signal amplifier to power driver compensator circuitry which receives the amplified alternating current signal from the wire and, in response, adjusts the input power to reduce optical noise. In instances where a length of the wire is positioned sufficiently near an electrically noisy environment such that the electrically noisy environment modifies the amplified alternating current signal, the significance of the modification to the amplified alternating current signal is reduced by amplifying the alternating current signal prior to exposing the alternating current signal to the electrically noisy environment, thereby enabling a significant reduction in the optical noise present in the laser output beam.

The present invention also relates to a method for producing a laser output beam having reduced optical noise. The method entails providing a laser output beam from a laser head wherein a power driver is coupled to the laser head to provide the laser head with input power for producing the laser output beam. Optical noise in the laser output beam is detected by an optical detector which then generates an alternating current signal in response. The alternating current signal is amplified and then carried on a wire to power driver compensator circuitry which receives the amplified alternating current signal from the wire and, in response, adjusts the input power to reduce optical noise. If, in the process of carrying the alternating current signal to the power driver compensator circuitry, a length of the wire is positioned sufficiently near an electrically noisy environment such that the high current environment modifies the amplified alternating current signal, the significance of the modification to the amplified alternating current signal can be reduced by amplifying the alternating current signal prior to exposing the alternating current signal to the electrically noisy environment, thereby enabling a significant reduction in the optical noise present in the laser output beam.

Other aspects and advantages of the present invention can be seen upon review of the figures, the detailed description, and the claims which follow.

DETAILED DESCRIPTION

A detailed description of the preferred embodiments of the present invention is provided with reference to the figures. The electrically noisy environment is discussed in the detailed description with regard to electrical noise generated by a high power wire. However, it should be understood that a variety of other elements in the laser system may create an electrically noisy environment near the wire or wires carrying the optical noise signal. These other electrical noise sources are also intended to fall within the scope of the present invention as sources of electrical noise.

Figure 1:
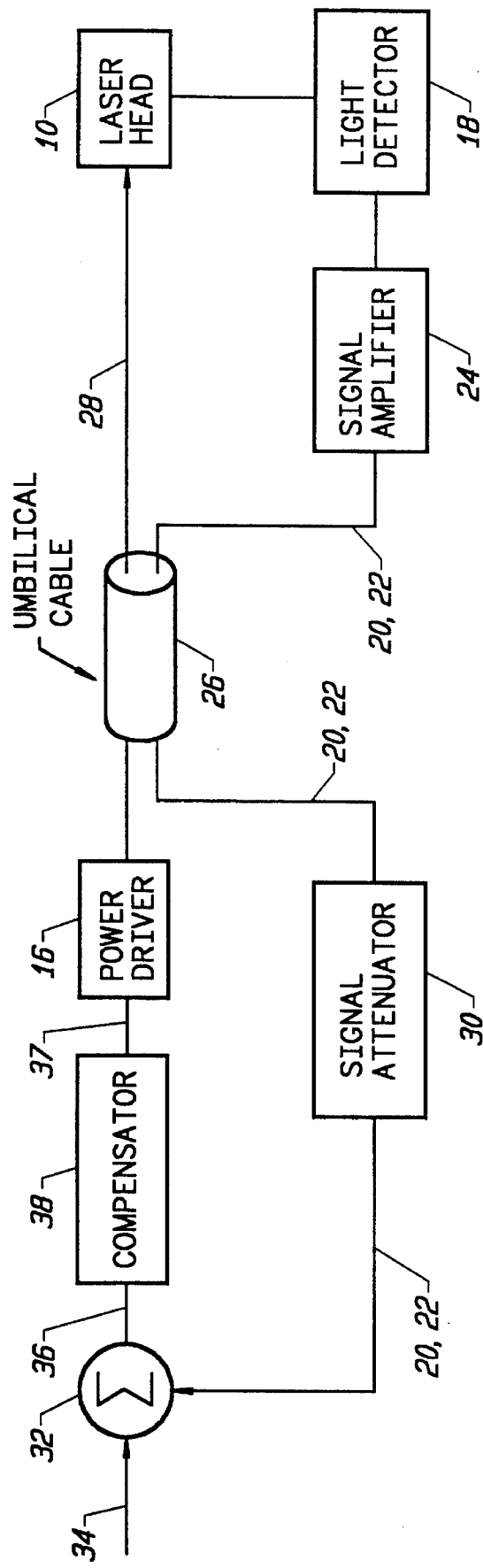
FIG. 1 is a schematic block diagram of a laser power supply servo system according to the present invention.

FIG. 1 provides an overview block diagram of a closed loop servo laser system according to the present invention. In FIG. 1, the entity being controlled is a laser head 10. The servo loop shown in FIG. 1 modulates the power output of power driver 16 which provides input power to laser head 10. The laser head 10 produces an output laser beam whose intensity increases as the input power provided by power driver 16 increases.

The power output of the laser head 10 is monitored using a light detector 18. The light detector may be any standard power monitoring device known in the art which includes, for example, photodiodes, photovoltaic cells, photoconductive cells and thermopiles. It is preferred that a photodiode be used as the light detector because they are readily available, inexpensive, and have a sufficient bandwidth.

The output of the light detector 18 produces an output signal including a direct current signal (DC signal) on line 20 corresponding to the average power output of the laser head and an alternating current signal (AC signal) on line 22 corresponding to the optical noise of the laser head output. As illustrated in FIG. 1, the DC signal and the AC signal are preferably carried on a single wire. Alternatively, the DC and AC signals may be carried on separate wires.

The AC signal is passed through a signal amplifier 24 where the AC signal is amplified. The significance of the benefit provided by the servo of the present invention increases as the degree of amplification is increased. The AC signal is therefore preferably amplified at least about 5 fold, more preferably at least about 10 fold, most preferably at least about 20 fold.

Any circuitry for amplifying an alternating current electrical signal may be used as the signal amplifier. It is preferred that an operational amplifier be used as the signal amplifier since they are inexpensive and readily available.

Figure 2:
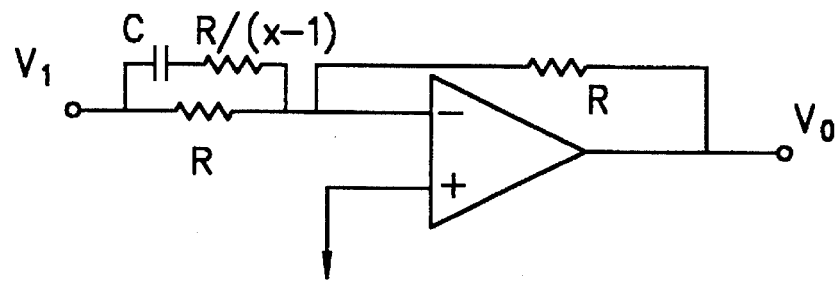
FIG. 2 illustrates a circuit suitable for use as a signal amplifier which amplifies the AC signal without modifying the DC signal.

It is generally preferred not to amplify the DC component of the current signal. In instances where both the alternating current and direct current signals are carried on a single wire, the signal amplifier preferably includes circuitry which amplifies the AC component of the light detector output without modifying the DC signal. A suitable circuit for amplifying an AC component of a signal without amplifying a DC component of the signal is illustrated in FIG. 2. As would be known to one of ordinary skill, there is a range of frequencies over which the circuit illustrated in FIG. 2 transitions from not amplifying the electrical signal to fully amplifying the electrical signal, thereby amplifying the AC signal while minimally amplifying the DC signal. More complex shaping of the frequency response is also possible.

Typical circuitry used in conventional amplifiers and feedback loops (op amps) have power supplies of ±12 volts or ±15 volts. Given that the DC signal is typically in the range of 1–10 volts, the DC component of the current signal can only be amplified to a limited degree by conventional amplifiers. One advantage provided by the servo loop of the present invention over the prior art is the fact that the DC component of the current signal need not be amplified, thereby enabling higher signal to noise ratios to be achieved.

Once the AC signal has been amplified by the signal amplifier, the output signal from the light detector is carried on line 20 to summing junction 32. The AC signal should be amplified after being produced by the light detector 18 prior to passing near an electrically noisy environment which may introduce electrical noise into the AC signal. FIG. 2 illustrates the electrically noisy environment as being an umbilical cable 26 within which the AC signal is conveyed along line 20. As illustrated in FIG. 2, the umbilical cable 26 also contains electrically noisy wires 28 which carry the input power from the power driver 16 to the laser head 10. These electrically noisy wires 28 represent one possible source of an electrically noisy environment that may be present in a laser system.

Figure 3:
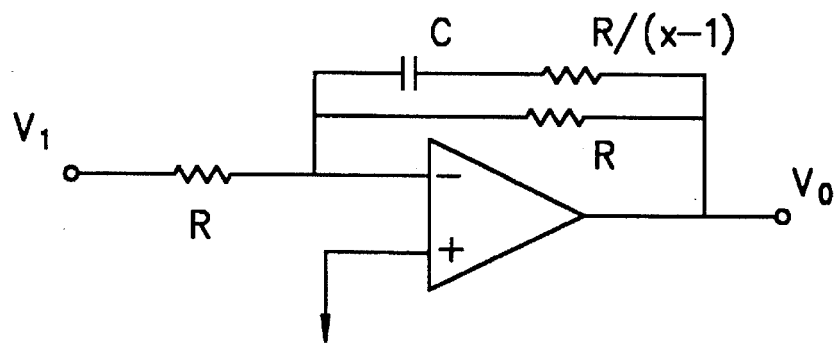
FIG. 3 illustrates a circuit suitable for use as a signal attenuator which attenuates the AC signal without modifying the DC signal.

Once the AC signal is passed through the umbilical cable 26, the AC signal may optionally be attenuated by a signal attenuator 30. Alternatively, a non-attenuated signal may be fed through a summing junction 32 to a compensator 38 as described below. The signal attenuator may be any circuitry capable of attenuating an alternating current electrical signal. It is preferred that simple resistive attenuator be used as the signal attenuator 30. In instances where both the AC and DC signals are carried on a single wire, the signal attenuator 30 preferably comprises circuitry capable of attenuating the AC signal without modifying the DC signal. A suitable circuit for attenuating an AC component of a signal without attenuating a DC component of the signal is illustrated in FIG. 3. As would be known to one of ordinary skill, there is a range of frequencies over which the circuit illustrated in FIG. 3 transitions from not attenuating the electrical signal to fully attenuating the electrical signal, thereby attenuating the AC signal while minimally attenuating the DC signal.

Whether the AC signal is attenuated or not, the DC and AC signals are fed to power driver compensator circuitry which modulates the power supplied to the laser head 10 by the power driver 16 in order to maintain the desired average power output and minimize optical noise.

In one embodiment, the power driver compensator circuitry includes a summing junction to which the DC and AC signals are fed. A control command used to set the desired output power of the laser head 10 is also imputed to the summing junction 32 on line 34. The output of the summing junction 32 on line 36 is an error signal corresponding to a DC error signal for the average power output of the laser and an AC error signal for the optical noise.

Figure 4:
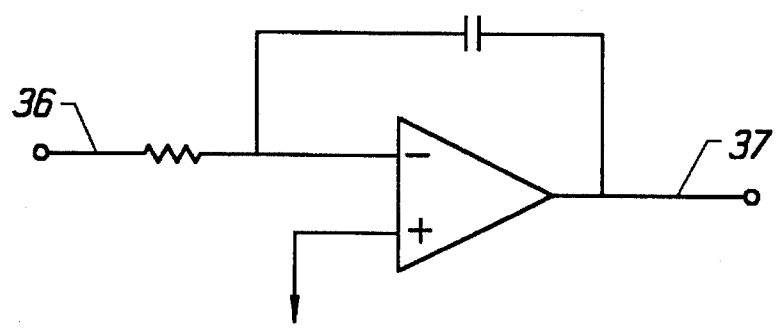
FIG. 4 illustrates circuitry suitable for use as a compensator in the present invention.

The error signal carried on line 36 from the summing junction 32 is supplied to a compensator 38 which sends a signal on line 37 to modulate the power supplied by the power driver 16 to the laser head in order to maintain the desired average power output as dictated by the control command imputed at line 34 and to minimize optical noise. The compensator 38 may be designed to interpret the AC signal, whether attenuated or not, in order to modulate the power driver to reduce optical noise. The compensator 38 may be any device known in the art for modifying a power driver. Circuitry for a particular compensator is illustrated in FIG. 4.

The compensator 38 is not able to distinguish between the actual optical noise signal and electrical noise introduced into the optical noise signal by the electrically noisy wires. Rather, the compensator 38 interprets both the AC and DC current inputs from line 36 as an error signal and uses the error signal to modify the power being supplied to the laser head. By amplifying the optical noise signal independent of the electrical noise, the servo loop system of the present invention is able to deemphasize the significance of the electrical noise component of the error signal relative to the optical noise. As a result, the ability of the compensator to reduce optical noise in the laser output is greatly enhanced.

The effectiveness of the closed loop servo of the present invention for reducing optical noise in a sample is illustrated by following example. Assume that the alternating current component of the light detector signal corresponding to the optical noise is 20 millivolts. Also assume that 5 millivolts of electrical noise is added to the optical noise signal as the optical noise signal is passed through an electrically noisy environment toward the summing junction 32. When the optical noise signal is not amplified prior to passing through the electrically noisy environment, the optical noise signal received by the summing junction 32 is 25 millivolts where the electrical noise corresponds to 25% of the optical noise signal. However, if the optical noise signal is amplified by a factor of 10 before being passed through the electrically noisy environment (such that the optical noise signal is 200 millivolts), the optical noise signal received by the summing junction 32 is 205 millivolts (20.5 millivolts if the signal is attenuated by a factor of 10 by a signal attenuator after passing through the umbilical cable) where the electrical noise corresponds to only 2.5% of the optical noise signal. As can be seen from this example, amplifying the optical signal prior to passing the optical signal through the umbilical cable significantly enhances the effectiveness of the closed loop servo system for reducing optical noise.

In a preferred embodiment of the present invention, the power driver compensator circuitry also includes the noise rejection circuitry described in U.S. patent application Ser. No. 08/277,343, entitled NOISE REJECTION CIRCUITRY AND LASER SYSTEM USING THE SAME, filed Jul. 19, 1994, which is incorporated herein by reference. The noise rejection circuitry is designed to filter periodic optical noise created by the alternating current used to heat the cathode tube in the laser head.

Figure 5:
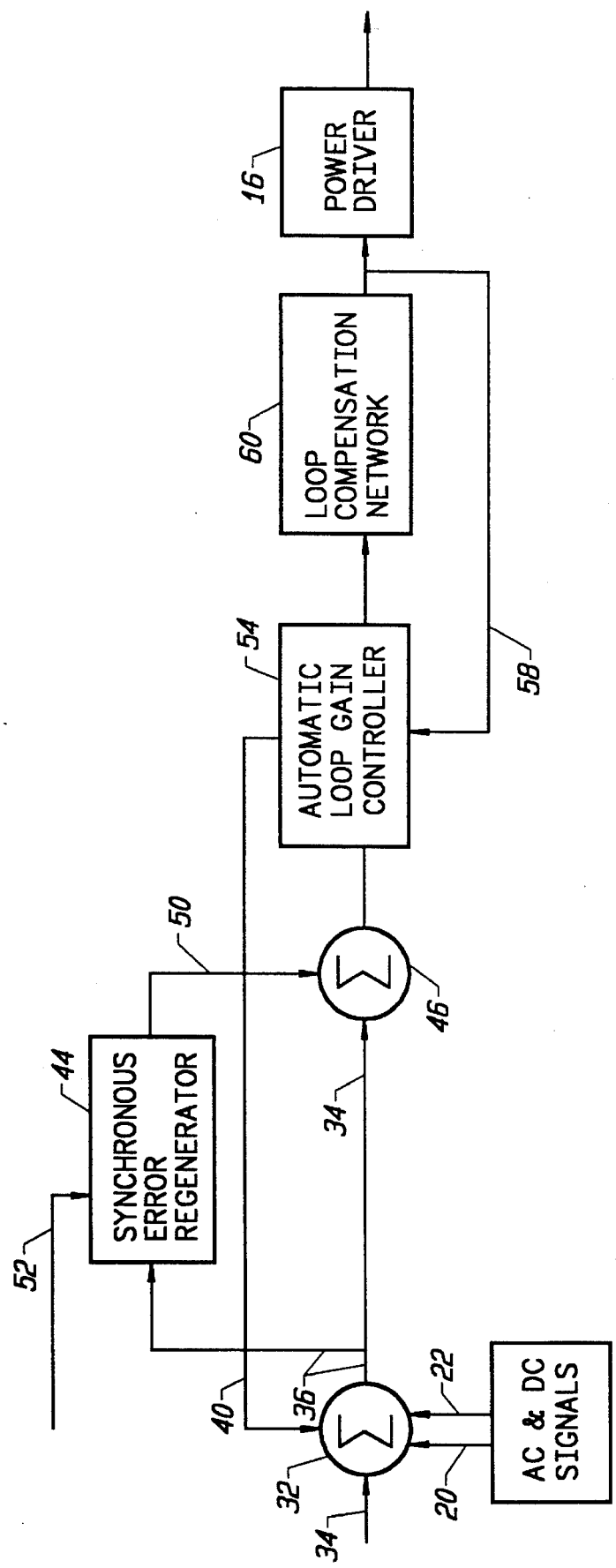
FIG. 5 illustrates a noise rejection circuit which may be used in conjunction with the laser power supply servo system of the present invention.

Inclusion of the noise rejection circuitry of U.S. patent application Ser. No. 08/277,343 into the servo loop of the present invention is illustrated in FIG. 5 in which a signal on line 40 from an automatic loop gain controller 54 is another input to the summing junction 32. The output of the summing junction 32 is an error signal on line 36. This error signal is supplied to a synchronous error regenerator 44 and to summing junction 46. Synchronous error regenerator 44 develops a stored version of the synchronous error and supplies that stored version to the summing junction 46 across line 50. The synchronous error regenerator 44 develops the stored version in response to a synch signal 52 which is supplied in synchronism with the predictable, periodic noise.

The output of the summing junction 46 is supplied to the automatic loop gain controller 54. The automatic loop gain controller 54 controls the gain of the loop automatically, in order to make sure that the loop is adjusted for optimum performance of the laser system.

The automatic loop gain controller 54 operates by injecting a low frequency signal (typically about 12 Hz) across line 40 to the summing junction 32. The gain of the loop is determined by measuring the magnitude of the resultant low frequency signal on line 58. The resultant low frequency signal on line 58 is detected by narrow band filter-detector circuitry, and fed to a multiplying means to allow the overall loop gain to be adjusted. Loop gain can thus be precisely controlled. Thus, the overall loop gain can be controlled to compensate for variations in the laser or other components of the servo loop. The signal on line 58 is typically a low frequency, low magnitude signal which has negligible impact on the output of the entity being controlled. However, because of the narrow band (typical bandwidth is 0.1 Hz) detection of the injected noise, it can be utilized to control overall loop gain.

The output of the automatic loop gain controller 54 is supplied to a loop compensation network 60 which provides a fixed, relatively broad band error compensation for the loop. The output of the loop compensation network 60 is supplied to the power driver 16, and controls the power supplied to the laser head 10 in response to the command in line 34 and an error compensation component generated in the loop. The synchronous error regenerator 44 supplies a component to the error signal which compensates for the very narrow band predictable periodic noise in the loop. This, in combination with the loop compensation network 60, provides a combination of relatively broad band compensation, and narrow band compensation for controlling the power driver. Thus, in response to the feedback signal on lines 20 and 22, the error compensation component is developed using the synchronous error regenerator 44, and the loop compensation network 60.

As described above, the closed loop servo system of the present invention provides excellent optical noise reduction by reducing the significance of electrical noise introduced relative to the optical noise signal. It is inexpensive to implement, not requiring digital signal processing and the like, which drives up the cost of the servo loops involved. Accordingly, the present invention provides an economical and highly effective technique for reducing optical noise in a laser output.

The foregoing description of preferred embodiments of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A servo controlled laser system providing a laser output beam having reduced optical noise comprising:
    a laser head providing a laser output beam;
    a power driver coupled to said laser head, said power driver supplying input power to said laser head;
    a light detector in the path of said output beam, said light detector generating an alternating current signal corresponding to optical noise present in said laser output beam;
    a signal amplifier coupled to said light detector for receiving and amplifying said alternating current signal;
    a wire coupled to said signal amplifier for receiving said amplified alternating current signal, a length of said wire being positioned sufficiently near an electronically noisy environment such that the electronically noisy environment modifies said amplified alternating current signal; and
    power driver compensator circuitry which receives said amplified alternating current signal from said wire and adjusts the input power supplied to said laser head to reduce optical noise in the laser head.

2. A servo controlled laser system according to claim 1 wherein said electronically noisy environment is generated by said wire supplying input power to said laser head.

3. A servo controlled laser system according to claim 1 wherein a length of said input power wire and a length of said wire coupled to said signal amplifier are housed within an umbilical cable.

4. A servo controlled laser system according to claim 1 wherein said signal amplifier amplifies said alternating current signal by a factor of between about 1 and 20.

5. A servo controlled laser system according to claim 1 wherein said signal amplifier amplifies said alternating current signal by a factor of at least about 20.

6. A servo controlled laser system according to claim 1, wherein said laser system further includes a signal attenuator coupling said wire to said power driver compensation circuitry, said attenuator attenuating said amplified alternating current.

7. A servo controlled laser system according to claim 6 wherein said signal amplifier amplifies said alternating current signal by a factor of between about 1 and 20 and said signal attenuator attenuates said amplified signal by a factor of between about 1 and 20.

8. A servo controlled laser system according to claim 1, wherein said signal amplifier amplifies said alternating current signal without amplifying a direct current component of said signal.

9. A servo controlled laser system according to claim 1, said power driver compensator circuitry comprising:
    a summing junction receiving inputs from said wire and a control signal, said summing junction producing an error signal corresponding to said optical noise; a compensator coupled to said summing junction wherein said compensator receives said error signal and adjusts the input power provided by said power driver.

10. A servo controlled laser system according to claim 9, said laser system further including a signal attenuator coupling said wire to said power driver compensator circuitry wherein said signal attenuator attenuates said amplified alternating current signal.

11. A servo controlled laser system according to claim 1 wherein said laser head is an ion laser head.

12. A method for producing a laser output beam having reduced optical noise comprising:
    providing a laser output beam from a laser head wherein a power driver is coupled to said laser head to provide said laser head with input power for producing said laser output beam;
    detecting optical noise in said laser output beam;
    generating an alternating current signal in response to said optical noise;
    amplifying said alternating current signal;
    carrying said amplified alternating current signal on a wire to power driver compensation circuitry where a length of said wire is positioned sufficiently near an electronically noisy environment that the electronically noisy environment modifies said amplified alternating current signal; and
    adjusting the input power provided to said laser head by said power driver with said power driver compensation circuitry in response to said amplified current signal.

13. A method according to claim 12 wherein said high current environment is generated by said input power to said laser head.

14. A method according to claim 12 wherein said signal amplifier amplifies said alternating current signal by a factor of between about 1 and 20.

15. A servo controlled laser system according to claim 12 wherein said signal amplifier amplifies said alternating current signal by a factor of at least about 20.

16. A method according to claim 12, further including the step of attenuating said amplified alternating current signal using said power driver compensation circuitry.

17. A method according to claim 16 wherein said signal amplifier amplifies said alternating current signal by a factor of between about 1 and 20 and said signal attenuator attenuates said amplified signal by a factor of between about 1 and 20.

* * * * *